Patented Aug. 3, 1926.

1,594,625

UNITED STATES PATENT OFFICE.

JAMES M. McCLAVE, OF DENVER, COLORADO, ASSIGNOR TO BITUMINOUS SAND COMPANY, OF DENVER, COLORADO, A CORPORATION OF COLORADO.

PROCESS FOR THE SEPARATION OF HYDROCARBONS FROM EARTHY MATTER.

No Drawing.   Application filed November 27, 1922. Serial No. 603,666.

My invention relates to a process for separating hydrocarbons from sand, rock and other earthy matter, the latter constituents coming under the general term of gangue, with which they are associated and its object is to provide a simple and efficient method of liberating hydrocarbons such as asphaltum, bitumen, petroleum and paraffin, from sand, rock and other baser constituents of the natural substances of which they form part, as a preparative to their complete separation.

With this object in view, my invention consists briefly in subjecting the crude material in a comminuted condition to the separative action of an alkaline argillaceous earth in water, to which may be added a small percentage of sodium silicate ($Na_2Si_4O_9$) in order to expedite and promote the process and render it commercially practical.

A clay which has been found to be particularly adapted for use in the process is that generally known as bentonite, the nature of which has been identified and described by the United States Bureau of Mines in its Report of Investigations by Raymond B. Ladoo, mineral technologist, October 1921, Serial No. 2289.

Clays of this type, varying according to their location and occurrence, are all characterized by an alkaline compound content, high absorptive properties and a strong colloidal action; they readily mix in water to a gelatinous consistency, have a very pronounced cleansing effect upon the silica or earthy matter in material with which they are intermixed, and they are totally devoid of affinity for hydrocarbons.

The above described properties of the clay, all of which function in the present process in liberating the hydrocarbons from the sands and other earthy matter in the material under treatment, are materially strengthened by the addition of the sodium silicate in quantities proportionate to the sodium content of the clay.

In carrying the process into effect, the argillaceous agent is mixed with water of ordinary temperature to the consistency of a thick gelatinous liquid. The proportions vary somewhat according to the nature of the clay and the character of the material to be treated, but about one part of the clay to ten parts of water have been found to give satisfactory results under ordinary conditions.

With the gelatinous clay liquid is intermixed the sodium silicate in proportions which likewise are varied according to the nature of the clay and the requirements of the oil and sand composition to which the process is applied. A mixture of one part of sodium silicate to ten parts of the liquid clay product has been found adequate under varying conditions.

After the hydrocarbonaceous substance has been comminuted, which in most materials of this type is readily accomplished by the application of heat, it is thoroughly intermixed with the compound of clay and sodium silicate in water until the hydrocarbons in the material are liberated from the sands so that by a subsequent treatment of gravity concentration they may be cleanly separated from the same.

The well known flotation process is particularly suited for this purpose and in order to expedite the movement of the freed hydrocarbons to the overflow level of the liquid used in the process, a small quantity of crude oil such as petroleum, or other flotation agent, may be added to the material.

The clay and sodium silicate compound if intermixed with the material in quantities sufficient to reach every sand particle in the comminuted mass (about one per cent of the material by weight is sufficient under ordinary conditions), destroys the power of adhesion of the hydrocarbons to the sand particles and thereby causes their mechanical liberation without dissolution so that by subsequent concentration they are rapidly separated from the earthy solids. Depending upon the character of the ore sufficient water is added to make the ore amenable to concentration by flotation.

The cleansing effect of the compound of clay and sodium silicate and its total lack of affinity for hydrocarbons, are highly effective factors in the process of separation since the one cleanly and rapidly frees every sand particle with which the compound is brought in contact, from its adherent hydrocarbons while the other prevents any absorption of the hydrocarbons by the clay and maintains them permanently in a separated state.

It will be apparent that the process as herein described may be simplified by heating the crude material after the clay and sodium silicate mixture has been added thereto, and thereby combine the comminution and mixing steps to take place at the same time and in the same container.

In order to increase the alkali metal-content of the clay, when this is necessary, as previously indicated, sodium silicate may be added in a quantity proportionate to the sodium content of the clay. It is, of course, clear that chemical equivalents of the sodium silicate type may be used in place of the sodium silicate to increase the alkali metal content of the clay. It is obvious that the chemical equivalents of sodium silicate need not be in silicate form as it is the metallic portion of the sodium silicate compound which is utilized to increase the alkali metal-content of the clay.

Having thus described my invention, what I claim and desire to secure by Letters Patent is:

1. The process of treating material containing hydrocarbons and gangue to separate the former from the latter comprising adding to the material in the presence of water a colloidal clay which when mixed with water forms a gelatinous mass, and recovering the hydrocarbons.

2. The process of treating material containing hydrocarbons and gangue to separate the former from the latter comprising adding to the material in the comminuted state in the presence of water a colloidal clay of jelly forming consistency and sodium silicate, and recovering the hydrocarbons.

3. The process of treating material containing hydrocarbons and gangue to separate the former from the latter comprising mixing the material with bentonite in the presence of water, and recovering the hydrocarbons.

4. The process of treating material containing hydrocarbons and gangue to separate the former from the latter comprising adding to the material in the presence of water a mixture of bentonite and sodium silicate, and recovering the hydrocarbons.

5. The process of treating material containing hydrocarbons and gangue to separate the former from the latter comprising adding to the material a mixture of 10 parts of bentonite water mixture and about 1 part of sodium silicate, and recovering the hydrocarbons.

6. The process of treating material containing hydrocarbons and gangue to separate the former from the latter comprising adding to the material a mixture of bentonite and sodium silicate in water, the quantity of the mixture being about 1 per cent of the material by weight, and recovering the hydrocarbons.

7. The process of treating material containing hydrocarbons and gangue to separate the former from the latter comprising adding to the material in the presence of water a colloidal clay of jelly forming consistency, and recovering the hydrocarbons therefrom by flotation.

8. The process of treating material containing hydrocarbons and gangue to separate the former from the latter comprising adding to the material in the presence of water a colloidal clay of jelly forming consistency and sodium silicate, and recovering the freed hydrocarbons by flotation.

9. The process of treating material containing hydrocarbons and gangue to separate the former from the latter comprising adding bentonite to the material in the presence of water, and recovering the freed hydrocarbons by flotation.

10. The process of treating material containing hydrocarbons and gangue to separate the former from the latter comprising adding to the material in the presence of water a colloidal clay of jelly forming consistency and sodium silicate, heating the resulting mixture, and recovering the freed hydrocarbons by flotation.

11. The process of treating material containing hydrocarbons and gangue to separate the former from the latter comprising adding to the material in the presence of water a clay characterized by an alkaline compound content, strong absorptive properties and a colloidal action, said clay on addition to the material forming a gelatinous mass, and recovering the hydrocarbons.

12. The process of treating material containing hydrocarbons and gangue to separate the former from the latter comprising adding to the material in the presence of water a colloidal clay of jelly forming consistency and a compound adapted to supply an alkali metal and recovering the hydrocarbons.

13. The process of treating material containing hydrocarbons and gangue to separate the former from the latter comprising adding to the material in the presence of water a clay characterized by an alkaline compound content, strong absorptive properties, and a colloidal action, said clay on the addition to the material forming a gelatinous mass, and a compound adapted to supply an alkali metal-content to increase the alkali metal-content of the clay, and recovering the hydrocarbons.

In testimony whereof I have affixed my signature.

JAMES M. McCLAVE.